United States Patent
Messink et al.

(10) Patent No.: US 9,956,870 B2
(45) Date of Patent: May 1, 2018

(54) DRIVE AXLE ASSEMBLY

(71) Applicant: SIEMENS AKTIENGESELLSCHAFT, München (DE)

(72) Inventors: Christoph Messink, Bocholt (DE); Todd R Morman, Pottsboro, TX (US); Lucas Paus, Rhede (DE); Franz Schmeink, Bocholt (DE); Matthias Weiss, Bocholt (DE)

(73) Assignee: FLENDER GMBH, Bocholt (DE)

( * ) Notice: Subject to any disclaimer, the term of this patent is extended or adjusted under 35 U.S.C. 154(b) by 0 days. days.

(21) Appl. No.: 15/309,060

(22) PCT Filed: Apr. 22, 2015

(86) PCT No.: PCT/EP2015/058666
§ 371 (c)(1),
(2) Date: Nov. 4, 2016

(87) PCT Pub. No.: WO2015/169595
PCT Pub. Date: Nov. 12, 2015

(65) Prior Publication Data
US 2017/0080799 A1    Mar. 23, 2017

(30) Foreign Application Priority Data

May 7, 2014  (EP) ..................................... 14167386

(51) Int. Cl.
*B60K 17/04* (2006.01)
*F16H 1/46* (2006.01)
*B60B 27/04* (2006.01)

(52) U.S. Cl.
CPC ............ *B60K 17/046* (2013.01); *B60B 27/04* (2013.01); *F16H 1/46* (2013.01); *B60Y 2200/20* (2013.01); *B60Y 2200/40* (2013.01)

(58) Field of Classification Search
None
See application file for complete search history.

(56) References Cited

U.S. PATENT DOCUMENTS 4,487,301 A * 12/1984 Harrison ................. B60B 27/04
                                                        188/71.5
8,834,312 B2    9/2014 KÜCÜKyavuz et al.
(Continued)

FOREIGN PATENT DOCUMENTS

DE    29616952 U1    2/1998
FR     2578302 A1    9/1986
(Continued)

*Primary Examiner* — Jacob S. Scott
*Assistant Examiner* — Timothy Hannon
(74) *Attorney, Agent, or Firm* — Henry M. Feiereisen LLC

(57) ABSTRACT

A drive axle assembly for a heavy goods vehicle includes a hollow hub, a wheel body rotatably mounted to the hollow hub, and a planetary gear including first and second planetary gear stages, each having a sun gear, a ring gear and a planet carrier with planetary wheels mounted rotatably in the planetary carrier and meshing with the sun gear and the ring gear. A drive shaft is axially guided through the hollow hub and the sun gear of the second planetary gear stage, with the sun gear of the first planetary gear stage being non-rotatably mounted on a vehicle-distal outer end of the drive shaft. Non-rotatably connected by a screw and pin connection to the hollow hub is an annular disk which has an axial opening and a plurality of boreholes in radially surrounding relationship to the axial opening.

11 Claims, 3 Drawing Sheets

(56) References Cited

U.S. PATENT DOCUMENTS

| | | | |
|---|---|---|---|
| 2004/0065169 A1* | 4/2004 | Ciszak | B60K 17/046 |
| | | | 74/640 |
| 2009/0215569 A1 | 8/2009 | Shibukawa | |
| 2013/0065724 A1* | 3/2013 | Shinohara | F16H 57/0479 |
| | | | 475/159 |

FOREIGN PATENT DOCUMENTS

| | | | |
|---|---|---|---|
| GB | 2040015 A | 8/1980 | |
| WO | WO 9012970 A1 | 11/1990 | |

* cited by examiner

US 9,956,870 B2

DRIVE AXLE ASSEMBLY

CROSS-REFERENCES TO RELATED APPLICATIONS

This application is the U.S. National Stage of International Application No. PCT/EP2015/058666, filed Mar. 24, 2015, which designated the United States and has been published as International Publication No. WO 20151169595 A1 which claims the priority of European Patent Application, Serial No. 14167386.3, filed May 7, 22014, pursuant to 35 U.S.C. 119(a)-(d).

BACKGROUND OF THE INVENTION

The present invention relates to a drive axle assembly for a heavy goods vehicle, in particular a mining truck.

U.S. Pat. No. 4,437,530 A (Euclid, Inc., Cleveland, Ohio, USA) 20 Mar. 1984 describes a drive axle assembly for a heavy goods vehicle. A planetary gear with a first stage 160 arranged externally and a second stage 162 arranged internally translates a motor-driven rotation of a drive shaft 36 into a slower rotation of the wheel rims 22. The sun gear 164 of the first stage 160 rests non-rotatably on an outer end of the drive shaft 36, which is guided axially through a non-rotating hollow hub. Planetary wheels 169 of the first stage 160 mesh both with the sun gear 164 of the first stage 160 and also with a ring gear 172 of the first stage 160. The planetary carrier 174 of the first stage 160 is non-rotatably connected both with the wheel body 22 and also with a ring gear 186 of the second stage 162. The ring gear 172 of the first stage 160 is non-rotatably connected to a sun gear 180 of the second stage 162. The planetary carrier 184 of the second stage 162 has an inner toothing 190, which is non-rotatably moved onto a corresponding outer toothing 120 of the hollow hub. Since the planetary carrier 174 of the first stage 160, the ring gear 186 of the second stage 162 and the wheel body 20 are connected to one another, the drive force of the drive shaft 36 is transmitted in two ways by means of the planetary gear to the wheels 16.

U.S. Pat. No. 7,204,782 B2 (Euclid-Hitachi Heavy Equipment, Ltd., Cleveland, Ohio, USA) Apr. 17, 2007 discloses a drive axle assembly similar to U.S. Pat. No. 4,437,530 A cited in the introduction. Here the planetary carrier 66 of the second stage 16b is non-rotatably connected to the hollow hub 10a by means of a double-toothed connecting ring ("carrier adapter"). The ring is connected to the planetary carrier 66 with a first toothing arranged on its outer periphery and to the hollow hub 10a with a second toothing arranged on its inner periphery.

US 2009/215569 A1 (Hitachi) 27 Aug. 2009 discloses a drive axle assembly.

DE 29616952 U1 (O&K Orenstein & Koppel AG) 5 Feb. 1998 describes a wheel hub with an integrated planetary gear, such as can be achieved for instance for a wheel bearing or mobile excavator. The planetary carrier is embodied as a stationary gear element and is connected to the axle limb of the axle in a manner free of play. The connection takes place here by way of screws in connection with a sleeve which enables a press-fit.

GB 2040015 A (GKN Axles) Aug. 20, 1980 describes a planetary gear, wherein the planetary bolts are fixed against rotation and axial movement in at least one direction by a lockwasher, which rests in a groove in the planetary carrier.

WO 90/12970 A1 (Komatsu) Nov. 1, 1990 describes a hydraulic motor with a two-stage planetary gear.

FR 2578302 A1 (O&K Orenstein & Koppel AG) Sep. 5, 1986 describes a wheel hub drive with a planetary gear with a minimal overall length with a movable mounting of the pinion shaft, planetary wheels, planetary carrier housing and wheel hub and a fixed connection of the ring gear by way of the coupling wheel with the axle housing body, wherein the coupling wheel is fixedly flanged on the axle housing body by way of a form and force-fit toothing at the end face.

SUMMARY OF THE INVENTION

The object underlying the invention is to specify an improved axle hub gear.

This object is achieved by a drive axle assembly for a heavy goods vehicle, in particular a mining truck. It comprises a hollow hub and a wheel body mounted rotatably on the outer periphery of the hollow hub, as well as a planetary gear with a first and a second planetary gear stage, which each comprise a sun gear, a ring gear and a planetary carrier with planetary wheels mounted rotatably therein. In this way the planetary wheels each mesh both with the sun gear and also with the ring gear. The drive axle assembly further comprises a drive shaft guided axially through the hollow hub and the sun gear of the second stage, on the outer end of which facing away from the vehicle the sun wheel of the first stage is non-rotatably arranged. Moreover, the planetary carrier of the first stage, the ring gear of the second stage and the wheel body are non-rotatably connected to one another. The ring gear of the first stage is non-rotatably connected to the sun gear of the second stage. Moreover, the planetary carrier of the second stage is non-rotatably connected to the hollow hub. To this end, the drive axle assembly has an annular disk, which is non-rotatably connected to the hollow hub by means of a screw and pin connection. The annular disk has an assembly of boreholes, which radially surround the axial opening of the annular disk, i.e. the ring hole, and is non-rotatably connected to the hollow hub by means of pins which are inserted through the boreholes into boreholes arranged in the hollow hub.

Here the pins are able to transmit a torque from the annular disk to the hollow hub. It is possible here for half of the pins to rest in the holes of the annular disk and the other half in the boreholes of the hollow hub. The boreholes preferably run in an axial direction.

The hollow hub can also be referred to as a spindle. The vehicle wheels, comprising rims and tires, are non-rotatably connected to the wheel body; alternatively the wheel body itself forms a part of the vehicle wheels, preferably at least part of the rims.

The hollow hub has two ends: one end is closer to the longitudinal axis of the vehicle, referred to below as "inner" or "interior"; the opposite end, by contrast, is closer to the wheels of the vehicle, referred to below as "outer" or "exterior".

The solution known from the afore-cited patent specification U.S. Pat. No. 7,204,782 B2 of non-rotatably connecting the planetary carrier of the second stage by means of a double-toothed connecting ring to the hollow hub, i.e. by means of two spline shaft connections, permits small movements, known as micro-movements, between the hollow hub and the component directly connected thereto, i.e. the double-toothed connecting ring, which may lead to premature wear.

Inventors have identified that these movements result in the connecting ring having to fulfill two functions which have different tolerance requirements: on the one hand the connecting ring should anchor the planetary carrier of the second stage to the hollow hub; on the other hand the initial load of the rolling bearings 11a and 11b, shown in U.S. Pat. No. 7,204,782 B2, FIG. 1, which serve to rotatably mount the wheel body on the hollow hub, is to be adjusted with the aid of the connecting ring.

The present invention avoids these disadvantages, by the double-toothed connecting ring being replaced by an annular disk with a screw and pin connection. In addition, the drive axle assembly can be produced more cost-effectively by dispensing with a spline shaft connection.

Moreover, in the region of the connection of the planetary carrier of the second stage to the hollow hub, the present drive axle assembly is shorter than previous solutions, i.e. its axial length is less. In return, this permits the rolling bearings, by way of which the wheel body is mounted on the hollow hub, to be distanced further from one another without the overall length of the drive axle assembly being greater than before. Increasing the distance of the rolling bearings from one another results in a reduction in the peak loads and thus in a longer service life of the rolling bearings.

Moreover, the present invention requires fewer components than previous solutions.

Advantageous embodiments of the invention form the subject matter of the subclaims.

It is preferable if the annular disk is non-rotatably connected to the planetary carrier of the second stage by means of a spline shaft connection. The advantage here is that the spline shaft connection, comparable to a toothed coupling, can balance out operational changes in position between the planetary carrier of the second planet stage and the hollow hub, within certain tolerances. Since this spline shaft connection only has to fulfill this single function, the tolerance required for this can be adjusted such that no unwanted micro-movements occur.

It is preferable for the spline shaft connection to be arranged on the outer periphery of the annular disk. The advantage here is that such a secure connection, including in the axial direction, can be produced with a corresponding toothing on an inner periphery of the planetary carrier of the second stage.

It is preferable for the annular disk to have an arrangement of continuous boreholes, which surround the axial opening of the annular disk, i.e. the ring hole. These boreholes serve to fasten the annular disk to the end face of the hollow hub. This takes place with the aid of stud bolts, which are screwed into threaded holes through the boreholes, said threaded holes being arranged in the end face of the hollow hub. The advantage here is that a fixed connection is created between the annular disk and the hollow hub, which can be easily detached on account of the good accessibility of the stud bolts.

It is possible for the annular disk to have the shape of a cylinder with an axial ring opening. Here the annular disk preferably has a coaxial disk-shaped recess on the end face facing the planetary carrier of the second stage, in which recess the screw heads of the stud bolts are disposed between the annular disk and the planetary carrier.

It is preferable if the drive axle assembly comprises a clamping ring positioned about the outer periphery of the hollow hub. This clamping ring rests here with a first end face on the annular disk and with a second end face on an inner ring of a rolling bearing, which serves to rotatably mount the wheel body on the outer periphery of the hollow hub. The advantage here is that the initial load of the rolling bearing, which serves to rotatably mount the wheel body on the hollow hub, can be adjusted.

A heavy goods vehicle with a drive axle assembly as described above is further advantageous.

A use of a drive axle assembly as described above in a heavy goods vehicle, in particular a mining truck, is further advantageous.

The above-described characteristics, features and advantages of this invention, as well as the manner in which these are realized, will become more clearly and easily intelligible in connection with the following description of exemplary embodiments which are explained in more detail with reference to the drawings. The drawings schematically show:

DETAILED DESCRIPTION OF THE EMBODIMENTS

Figure 1:
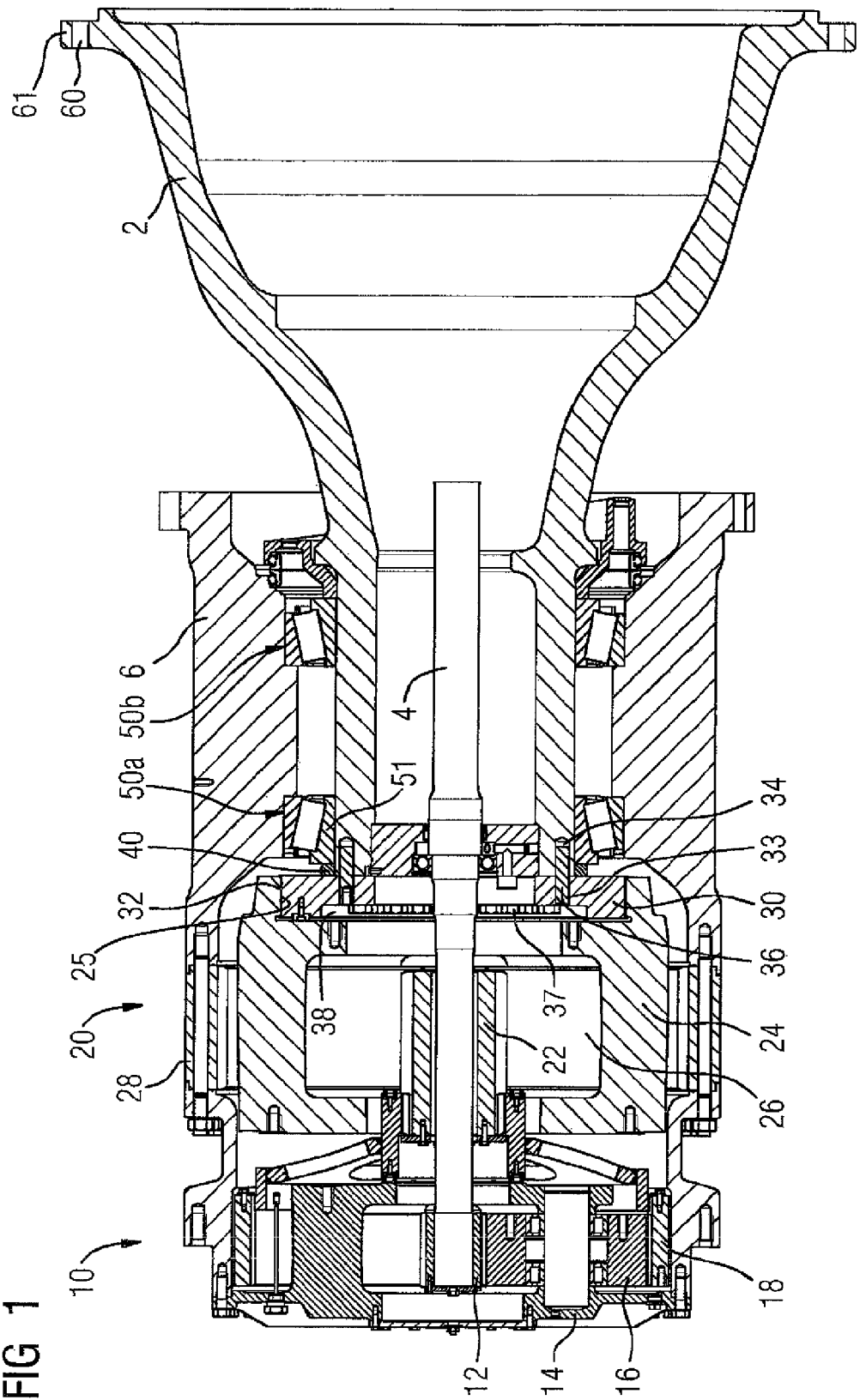
FIG. 1 a longitudinal section of a drive axle assembly,
FIG. 2 a longitudinal section of a second planetary gear stage,
FIG. 3 an axial cut through an annular disk,
FIG. 4 a view of an annular disk according to a first embodiment, and
FIG. 5 a view of an annular disk according to a further embodiment.

FIG. 1 shows a drive axle assembly for a heavy goods vehicle, e.g. a mining truck. A bell-shaped hollow hub 2 with a curved section and a narrower, cylindrical section has a circumferential flange 61 with flange holes 60 on the end face of the curved section. As a result, the hollow hub 2, arranged perpendicular to the longitudinal axis of the vehicle, can be connected to a drive train of the vehicle, e.g. to a differential gear housing. The hollow hub 2 thus has two sections: the curved section is closer to the longitudinal axis of the vehicle, referred to below as "inner" or "interior"; the narrower section, by contrast, is closer to the wheels of the vehicle, referred to below as "outer" or "exterior". A drive shaft 4 is rotatably mounted in the narrower section of the hollow hub 2, which, at its inner end, has an interface for connection, preferably by interconnecting a coupling, with a shaft of a drive train, wherein this drive train shaft for its part is rotationally driven by a motor of the vehicle, e.g. an electric motor or combustion engine.

Two rolling bearings 50a, 50b are arranged on the outer periphery of the hollow hub 2, with which a wheel body 6 is rotatably mounted about the hollow hub 2. The vehicle wheels, comprising rims and tires, are non-rotatably connected to the wheel body 6; alternatively the wheel body 6 itself forms part of the vehicle wheels.

A two-stage planetary gear 10, 20 is coupled to the drive shaft 4, said planetary gear converting the motor-driven rotation of the drive shaft 4 into a slower rotation of the wheels. The planetary gear comprises a first, externally arranged stage 10 and a second, internally arranged stage 20, so that the second planetary stage 20 is arranged axially between the first planetary stage 10 and the hollow hub 2.

The drive shaft 4 is guided axially through the hollow hub 2 and a sun gear 22 of the second stage 20. The sun gear 12 of the first stage 10 rests non-rotatably on the outer end of the drive shaft 4 which protrudes outwards from the sun gear 22 of the second stage 20. Planetary wheels 16 of the first stage 10, which are rotatably mounted in a planetary carrier 14 of the first stage 10, mesh both with the sun gear 12 of the first stage 10 and also with a ring gear 18 of the first stage 10. The planetary carrier 14 of the first stage 10 is non-rotatably connected both with the wheel body 6 and also with a ring gear 28 of the second stage 20. The ring gear 28 of the first stage 20 is non-rotatably connected to a sun gear 22 of the second stage 20.

The planetary carrier 24 of the second stage 20 is non-rotatably connected to the hollow hub 2 by means of an annular disk 30. Here the annular disk 30 is non-rotatably connected to the planetary carrier 24 of the second stage 20 on the one hand by means of a spline shaft connection 25, 32, comprising an outer toothing 32 arranged on the radial outer periphery of the annular disk 30 and a corresponding inner toothing 25 of the planetary carrier 24 of the second stage 20. On the other hand, the annular disk 30 is non-rotatably connected to the hollow hub 2 by way of a screw and pin connection.

Figure 5:
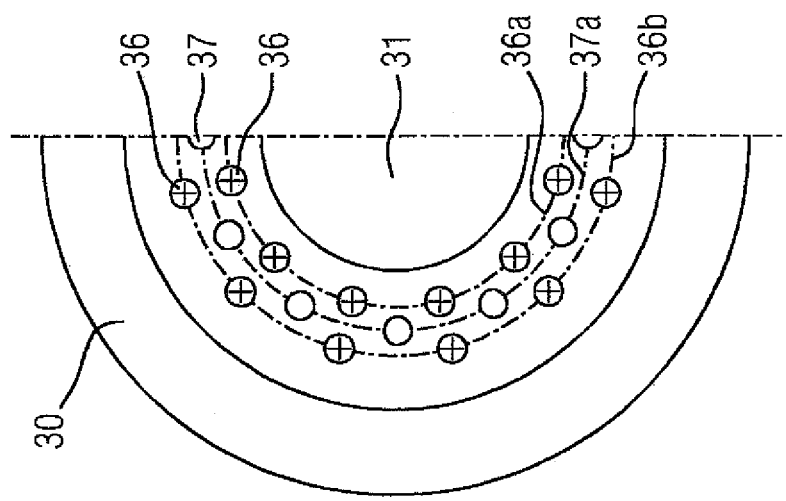
Figure 4:
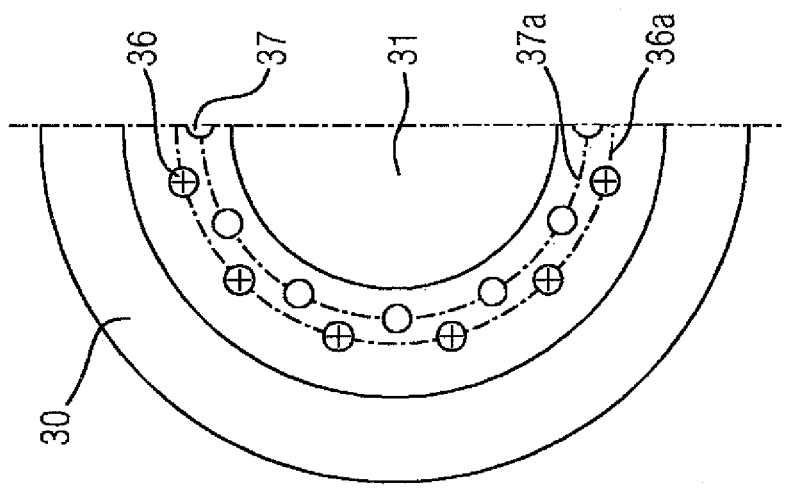

As shown in FIGS. 4 and 5, the annular disk 30 has a circular arrangement 37a of first boreholes 33, which surround the axial opening 31 of the annular disk 30, i.e. the ring hole. The hollow hub 2 has threaded holes on its outer end face, which are flush with the first boreholes 33 of the annular disk 30. Screws 37 are inserted through the first boreholes 33 and are screwed into the threaded holes which are arranged at the end face of the hollow hub 2.

Furthermore the annular disk 30 has at least one circular arrangement 36a, 36b of second boreholes 33, which surround the axial opening 31 of the annular disk 30, i.e. the ring hole. The hollow hub 2 has boreholes preferably embodied as blind holes on its outer end face, which are flush with the second boreholes 33 of the annular disk 30. The annular disk 30 and the hollow hub 2 are non-rotatably connected to one another by means of pins 36, which are inserted into the second boreholes 33 of the annular disk 30 with its one end and into the boreholes 34, which are arranged at the end face of the hollow hub 2, with its other end.

A screw and pin connection is embodied between the annular disk 30 and the hollow hub 2 by the pins 36 transmitting the torque from the annular disk 30 onto the hollow hub 2 and the screws 37 pressing the annular disk 30 onto the end face of the hollow hub 2.

Here FIG. 4 shows a first embodiment of an annular disk 30, in which an inner, circular screw arrangement 37a is surrounded radially by a circular pin arrangement 36a.

Here FIG. 5 shows a further embodiment of an annular disk 30, in which a circular screw arrangement 37a is disposed radially between an inner 36a and an outer 36b circular pin arrangement. It is possible to define which maximum torque can be transmitted by the screw and pin arrangement by means of the number of pins 37 which transmit the torque.

Figure 3:
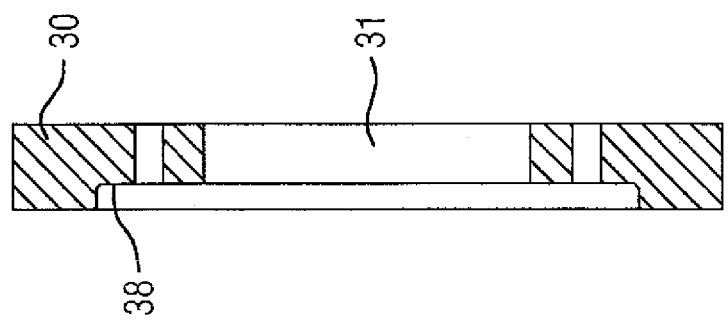

Here the annular disk 30 has the shape of a cylinder with an axial ring opening 31. As shown in FIG. 3, here the annular disk 30 has a coaxial disk-shaped recess 38 on the end face facing the planetary carrier 24 of the second stage 20, in which recess the screw heads of the stud bolts 37 are disposed between the annular disk 30 and the planetary carrier 24.

Disposed around the outer periphery of the hollow hub 2 is a clamping ring 40, which, on the one hand, rests on the inner end face of the annular disk 30 and on the other hand on an outer end face of an inner ring 51, wherein the inner ring 51 forms part of the outer rolling bearing 50 of the rolling bearing pair 50, which serves to mount the wheel body 6 on the hollow hub 2. In this way the initial load of the rolling bearing 50 can be adjusted directly by the annular disk 30.

Figure 2:
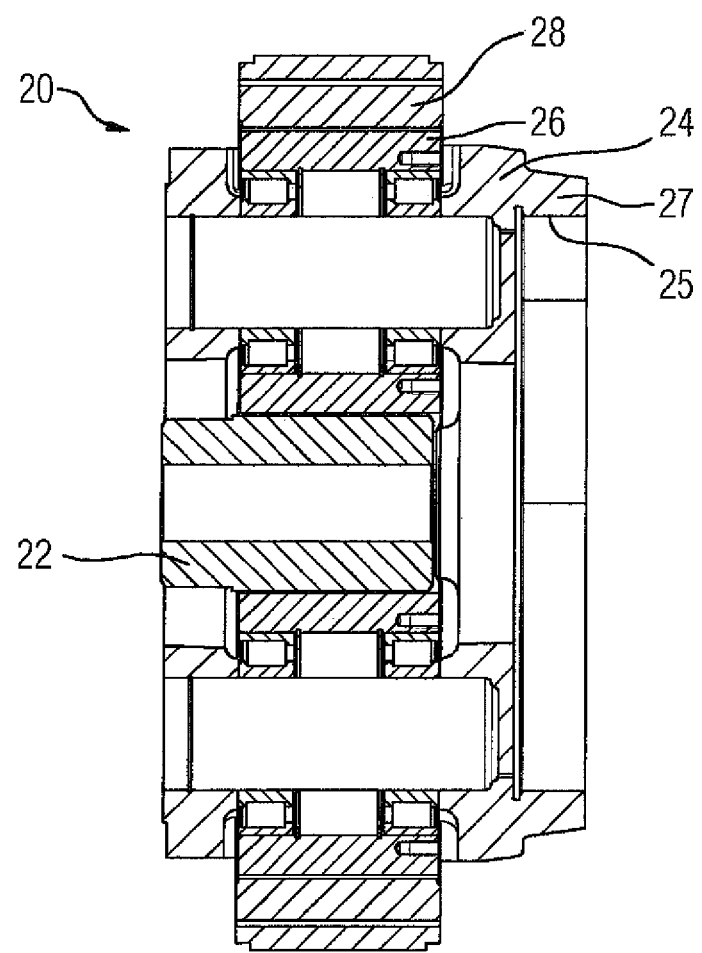

FIG. 2 shows an axial cut through the second planetary gear stage 20, comprising a sun gear 22, a ring gear 28 and a planetary carrier 24 with planetary wheels 26 mounted rotatably therein, which mesh both with the sun gear 22 and also the ring gear 28. The planetary carrier 24 has an annular flange 27 on the end face which faces inwards. On its inner periphery the flange 27 has a toothing, in which a corresponding outer toothing of an annular disk (not shown) can be inserted in order thus to embody a non-rotatable spline shaft connection between the planetary carrier 24 and the annular disk.

The invention claimed is:

1. A drive axle assembly for a heavy goods vehicle, comprising:
   a hollow hub;
   a wheel body mounted rotatably on an outer periphery of the hollow hub;
   a planetary gear including a first planetary gear stage and a second planetary gear stage, each of the first and second planetary gear stages including a sun gear, a ring gear, a planetary carrier, and planetary wheels mounted rotatably in the planetary carrier and meshing with the sun gear and the ring gear, with the planetary carrier of the first planetary gear stage, the ring gear of the second planetary stage, and the wheel body being non-rotatably connected to each other, with the ring gear of the first planetary gear stage being non-rotatably connected to the sun gear of the second planetary gear stage, and the planetary carrier of the second planetary gear stage being non-rotatably connected to the hollow hub;
   a drive shaft axially guided through the hollow hub and the sun gear of the second planetary gear stage, said sun gear of the first planetary gear stage being non-rotatably mounted on a vehicle-distal outer end of the drive shaft;
   an annular disk having an axial opening and a plurality of boreholes in radially surrounding relationship to the axial opening; and
   a screw and pin connection having pins inserted through the boreholes of the annular disk into boreholes in the hollow hub to non-rotatably connect the annular disk to the hollow hub.

2. The drive axle assembly of claim 1, further comprising a spline shaft connection configured to non-rotatably connect the annular disk to the planetary carrier of the second planetary gear stage.

3. The drive axle assembly of claim 2, wherein the spline shaft connection is arranged on an outer periphery of the annular disk.

4. The drive axle assembly of claim 1, wherein the screw and pin connection includes at least one stud bolt to fasten the annular disk to an end face of the hollow hub.

5. The drive axle assembly of claim 1, further comprising a clamping ring and a rolling bearing, said rolling bearing including an inner ring and being configured to rotatably mount the wheel body on an outer periphery of the hollow hub, said clamping ring being positioned around an outer periphery of the hollow hub and resting on the annular disk and on the inner ring of the rolling bearing.

6. A heavy goods vehicle, comprising a drive axle assembly, said drive axle assembly comprising a hollow hub, a wheel body mounted rotatably on an outer periphery of the hollow hub, a planetary gear including a first planetary gear stage and a second planetary gear stage, each of the first and second planetary gear stages including a sun gear, a ring gear, a planetary carrier, and planetary wheels mounted rotatably in the planetary carrier and meshing with the sun gear and the ring gear, with the planetary carrier of the first planetary gear stage, the ring gear of the second planetary stage, and the wheel body being non-rotatably connected to each other, with the ring gear of the first planetary gear stage being non-rotatably connected to the sun gear of the second planetary gear stage, and the planetary carrier of the second planetary gear stage being non-rotatably connected to the hollow hub, a drive shaft axially guided through the hollow hub and the sun gear of the second planetary gear stage, said sun gear of the first planetary gear stage being non-rotatably mounted on a vehicle-distal outer end of the drive shaft, an annular disk having an axial opening and a plurality of boreholes in radially surrounding relationship to the axial opening, and a screw and pin connection having pins inserted through the boreholes of the annular disk into boreholes in the hollow hub to non-rotatably connect the annular disk to the hollow hub.

7. The heavy goods vehicle of claim 6, constructed in the form of a mining truck.

8. The heavy goods vehicle of claim 6, wherein the drive axle assembly includes a spline shaft connection configured to non-rotatably connect the annular disk to the planetary carrier of the second planetary gear stage.

9. The heavy goods vehicle of claim 8, wherein the spline shaft connection is arranged on an outer periphery of the annular disk.

10. The heavy goods vehicle of claim 6, wherein the screw and pin connection includes at least one stud bolt to fasten the annular disk to an end face of the hollow hub.

11. The heavy goods vehicle of claim 6, wherein the drive axle assembly includes a clamping ring and a rolling bearing, said rolling bearing including an inner ring and being configured to rotatably mount the wheel body on an outer periphery of the hollow hub, said clamping ring being positioned around an outer periphery of the hollow hub and resting on the annular disk and on the inner ring of the rolling bearing.

* * * * *